United States Patent [19]
Suzuki et al.

[11] Patent Number: 6,038,404
[45] Date of Patent: *Mar. 14, 2000

[54] LENS BARREL FOR A CAMERA HAVING A NON-ROTATABLE CAM RING MOVED BY A FEED SCREW

[75] Inventors: Shinichi Suzuki, Izumi; Toyotoshi Kawasaki, Kawachinagano, both of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/787,539

[22] Filed: Jan. 22, 1997

[30] Foreign Application Priority Data

Jan. 25, 1996 [JP] Japan .................................. 8-010593

[51] Int. Cl.[7] ........................... G02B 15/14; G03B 17/00
[52] U.S. Cl. ............................. 396/79; 396/87; 359/696; 359/823; 348/357
[58] Field of Search .......................... 396/72, 79, 85, 396/87; 359/684, 694, 696, 697, 699–701, 823; 348/357, 358, 345

[56] References Cited

U.S. PATENT DOCUMENTS

| | | | |
|---|---|---|---|
| 4,821,972 | 4/1989 | Wakabayashi | 396/349 |
| 4,873,542 | 10/1989 | Nakayama | 396/144 |
| 5,301,066 | 4/1994 | Higuchi et al. | 396/698 |
| 5,319,498 | 6/1994 | Hara et al. | 359/824 |
| 5,392,159 | 2/1995 | Sasaki et al. | 359/691 |
| 5,576,894 | 11/1996 | Kuwana et al. | 359/701 |

*Primary Examiner*—Safet Metjahic
*Assistant Examiner*—J. K. Han
*Attorney, Agent, or Firm*—McDermott, Will & Emery

[57] ABSTRACT

A varifocal mechanical correction mechanism for a lens barrel for a camera, wherein the mechanism drives a lens with a pair of cam rings for carrying out zooming and focusing functions. One of the cam rings is caused to linearly move in and out along an optical axis by a feed screw. The feed screw that has a shank portion outside a normal feed range and on a non-threaded portion of a shaft.

21 Claims, 16 Drawing Sheets

WIDE ANGLE-∞

TELEPHOTO-∞

WIDE ANGLE-NEAR

TELEPHOTO-NEAR

LENS BARREL FOR A CAMERA HAVING A NON-ROTATABLE CAM RING MOVED BY A FEED SCREW

BACKGROUND OF THE INVENTION

1. Field of the Invention

The present invention relates to a lens barrel using a varifocal optical system, and more particularly, to an improvement of a lens driving system for performing zooming and focusing by use of a built-in driving source such as a motor.

2. Description of the Prior Art

In a typical zoom lens barrel, to perform zooming and focusing, a plurality of lens units are divided into zooming units exclusively used for zooming and focusing units exclusively used for focusing to fix the role of each lens unit, a zoom cam and a groove for converting an operation of an operation ring into a movement of the lens units are formed on a ring or a stationary barrel for moving the lens units, and zooming and focusing are performed by a combination of the zoom cam and the groove. In this arrangement, however, the zoom ratio cannot be increased and a lens capable of focusing for near objects cannot be realized.

On the contrary, a lens barrel having a varifocal optical system realizes an increased zoom ratio and focusing for near objects by using the zooming lens units also for focusing. This type of lens barrel employs a mechanism comprising a combination of a zoom cam and a focus cam where zooming is performed by rotating the zoom cam and focusing is performed by non-rotatively moving the focus cam along the optical axis.

In this case, as shown in FIG. 1, a zoom cam z and a focus cam f are both formed to be linear in a developed condition. In this arrangement, however, the ratio between the movement amount of the cam and the movement amount of the lens is the same at the zoom position on the short focal length side (wide angle side) and at the zoom position on the long focal length side (telephoto side), so that the movement amount of the focus cam ring varies. Therefore, this arrangement cannot be put into practical use.

Thus, in the varifocal optical system, since the focusing movement amount of a predetermined lens unit from infinity with respect to a subject varies according to the zoom position, as shown in FIGS. 2A and 2B, the cam configuration is necessarily determined so that a movement amount x of the focus cam ring is fixed. With such a cam configuration, the movement amount of the focus cam ring is the same both at the wide angle side zooming position and at the telephoto side zooming position similarly to the normal zoom lens although the movement amount of the cam varies between a movement amount y1 on the wide angle side shown in FIG. 2A and a movement amount y2 on the telephoto side shown in FIG. 2B.

FIGS. 3A and 3B show a movement of a focusing block as a basic mechanism of the varifocal optical system. A zoom cam ring 51 is rotatively moved. A stationary barrel 52 is stationary. A focus cam ring 53 is moved along the optical axis. Numeral 54 represents a lens moving frame on which a guide pin 55 is formed. The guide pin 55 engages both with a cam groove of the zoom cam ring 51 and with a cam groove of the focus cam ring 53. Reference character p represents a movement amount of the second lens unit on the wide angle side during focusing. Reference character q represents a movement amount of the second lens unit on the telephoto side during focusing. Typically, q is greater than p.

FIG. 4 shows an example of a focusing mechanism provided in a conventional lens barrel having a varifocal optical system. In the lens barrel shown in the figure, a helicoid cylinder 56 having a helicoid screw 56a on its inner dimension and having a helicoid gear 56b on its outer dimension is held to be only rotatable. The helicoid gear 56a engages with a screw 57a formed on a focus cam ring 57. The screw 57a is circumferentially formed on an end portion of the focus cam ring 57. The helicoid gear 56b meshes with a gear 58a of a focus deceleration gear train 58. The input of the focus deceleration gear train 58 is coupled to a manual focus ring (not shown) and to an AF (auto-focus) motor 59.

In the above-described conventional arrangement, the rotation of a focusing ring (not shown) or the rotation driving of the AF motor 59 is decelerated by the focus deceleration gear train 58 and transmitted to the helicoid cylinder 56, and by the rotation of the helicoid cylinder 56, the focus cam ring 57 coupled to the helicoid screw 56a is non-rotatively moved.

In the above-described conventional arrangement, however, since a heavyweight gear train such as the large diameter helicoid cylinder 56 is necessary and the proportion of the deceleration by the gear deceleration system is greater as shown in FIG. 5, the size increases, so that the size and weight of the camera cannot be reduced. Since the gear deceleration system is a combination of a plurality of gears, the number of parts increases to increase the weight. In addition, since a large motor having a large torque is necessary to drive such a gear train, the cost increases.

In order to prevent over-engagement between the screw 57a of the focus cam ring 57 and the helicoid screw 56a at the drive end, it is necessary to provide, for example, a focus stopper (not shown) on the stationary barrel or on the focusing ring to limit the rotation of the focusing ring. This results in an increase in the number of parts and in the number of production processes.

To solve such problems of the lens driving mechanism using a helicoid, an arrangement using a feed screw 60 as shown in FIG. 6A has been proposed. In this lens driving mechanism, since it is necessary to prevent over-engagement of the feed screw 60 when the lens is moved to the limit position, a guide cylinder 61 for guiding the feed screw 60 has a hole 61a passing through its peripheral wall, a ball 62 is inserted in the hole 61a so as to roll along the root of the feed screw 60, and the ball 62 is pressed against the feed screw 60 by a flat spring 63 provided on the guide cylinder 61.

In this arrangement, as shown in FIG. 6B, when the feed screw 60 is further driven after reaching the drive end, the ball 62 is rolled over a non-threaded portion 60a of the feed screw 60 and pushed out of the hole 61a against the pushing force of the flat spring 63 to prevent the over-engagement.

In the conventional lens driving mechanism using the feed screw 60, however, since a ball is used in the over-engagement preventing arrangement, the torsion pitch of the feed screw 60 cannot be reduced. For this reason, the proportion of the deceleration by the feed screw 60 is not sufficient, so that the proportion of the deceleration by the gear train in the deceleration system between the AF motor and the feed screw 60 is far greater than that of the deceleration by the screw. Thus, this arrangement is not a satisfactory solution.

SUMMARY OF THE INVENTION

An object of the present invention is to provide a compact, lightweight and low-cost lens barrel in which the proportion of the deceleration by the screw is greater than that of the deceleration by the gear train by preventing the over-engagement of the screw at the drive end while increasing the proportion of the deceleration by the screw.

To solve the above-mentioned object, according to the present invention, in a lens barrel having a varifocal mechanical correction mechanism which mechanically drives the lens both for zooming and for focusing with a zoom cam ring and a focus cam ring, either the zoom cam ring or the focus cam ring is a cam ring which is non-rotatively moved along the optical axis and the non-rotatively moved cam ring is moved by a feed screw rotated by a driving source.

With the arrangement in which the cam ring is directly moved by the feed screw, the number of parts is reduced, space is saved, and the cost is reduced. In addition, since the cam ring is driven at a low torque, focus driving is performed only by a low-output and inexpensive electromagnetic motor and a deceleration system.

In the above-described arrangement, when the cam ring moved by the feed screw is the focus cam ring, the focus cam ring is driven at a low torque, so that focus driving is performed only by a low-output and inexpensive electromagnetic motor and a deceleration system.

By providing a shank portion outside a normal drive range on the feed screw and by forming the shank portion as a non-threaded portion, when the feed screw is driven past the normal drive range, a female screw is moved into the non-threaded range, so that no over-engagement is caused. In this case, by arranging a cam ring constituting member driven by the feed screw so as to be pushed in the shank portion in a direction such that the female screw engages with the feed screw, the screws again engages with each other when the motor is driven in a reverse direction from the condition where the feed screw is driven past the normal drive range to move the female screw into the non-threaded range.

By providing a detector such as an electric switch for detecting the normal drive range of the cam ring moved by the feed screw, the operation to engage the screws again is immediately started.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
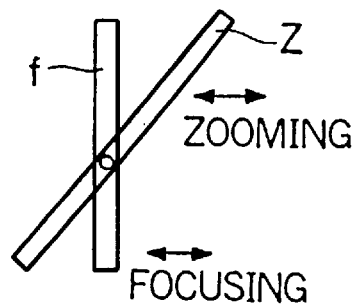
FIG. 1 is a schematic view of assistance in explaining a disadvantage of a conventional varifocal optical system.
Figure 2A:
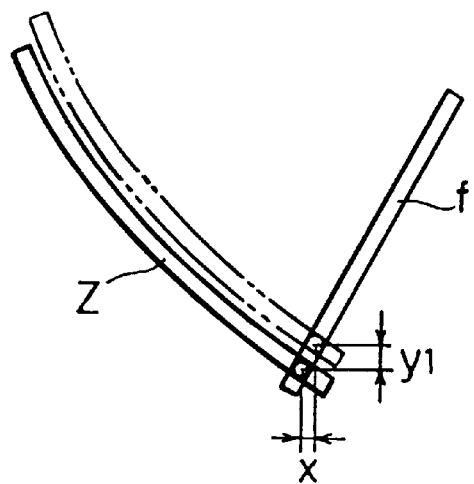
FIGS. 2A and 2B are schematic views of assistance in explaining movement of the conventional varifocal optical system on the wide angle side and on the telephoto side.
Figure 2B:
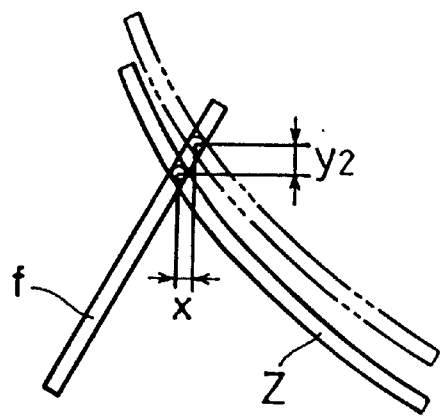
Figure 3A:
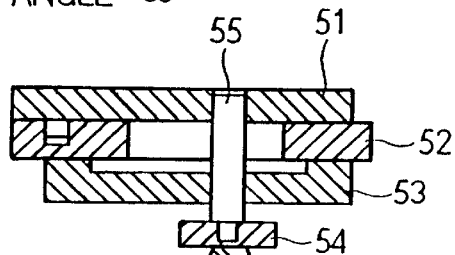
FIGS. 3A and 3B are schematic views of assistance in explaining movement of lenses of the conventional varifocal optical system.
Figure 3B:
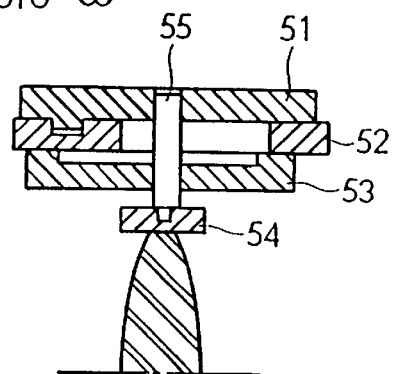
Figure 3B:
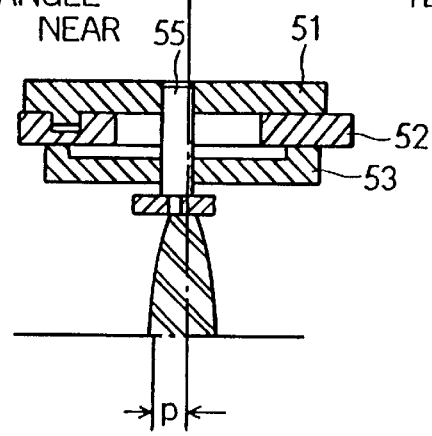
Figure 3B:
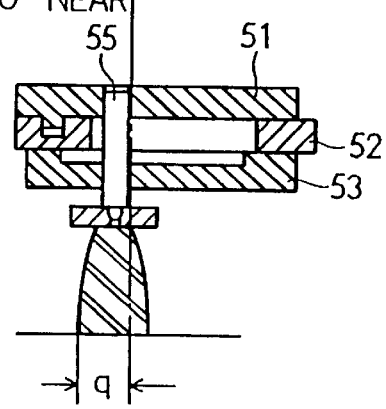
Figure 4:
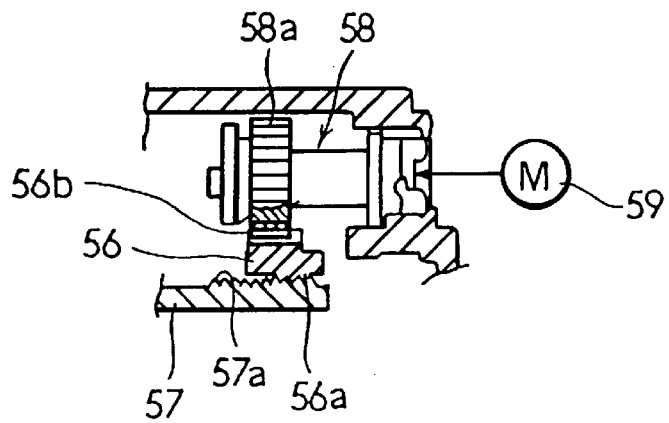
FIG. 4 is a cross-sectional view of a conventional arrangement.
Figure 5:
FIG. 5 shows the proportion of the deceleration by the gear to the deceleration by the screw in the conventional arrangement.
Figure 6A:
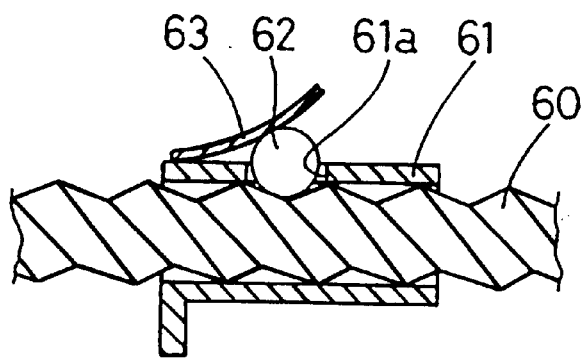
FIGS. 6A and 6B are cross-sectional views of an example of a conventional lens driving mechanism using a feed screw.
Figure 6B:
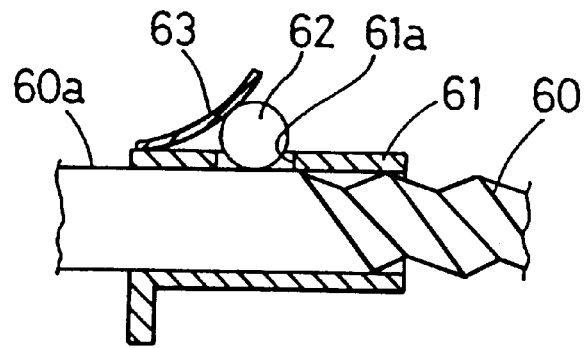
Figure 7:
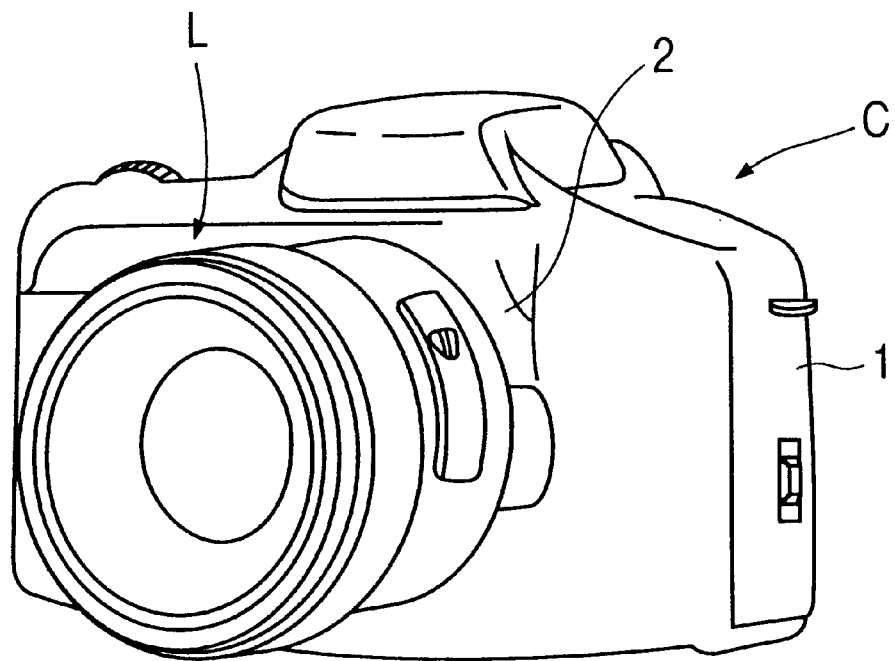
FIG. 7 is a perspective view of a camera on which a lens barrel according to an embodiment of the present invention is mounted.

Hereinafter, an embodiment of a lens barrel according to the present invention will be described with reference to the drawings. FIG. 7 is an external view of a camera on which a lens barrel according to this embodiment is mounted. A camera C shown in the figure is a single lens reflex camera to which a plurality of types of detachable taking lenses are attachable. The camera C has AF (automatic focus) and AE (automatic exposure) functions and has a lens barrel mounting portion 2 substantially in its center. Although not shown, a power supply battery for supplying power to driving, display and photometric systems of the camera and lens is replaceably loaded in a camera body 1.

Figure 8:
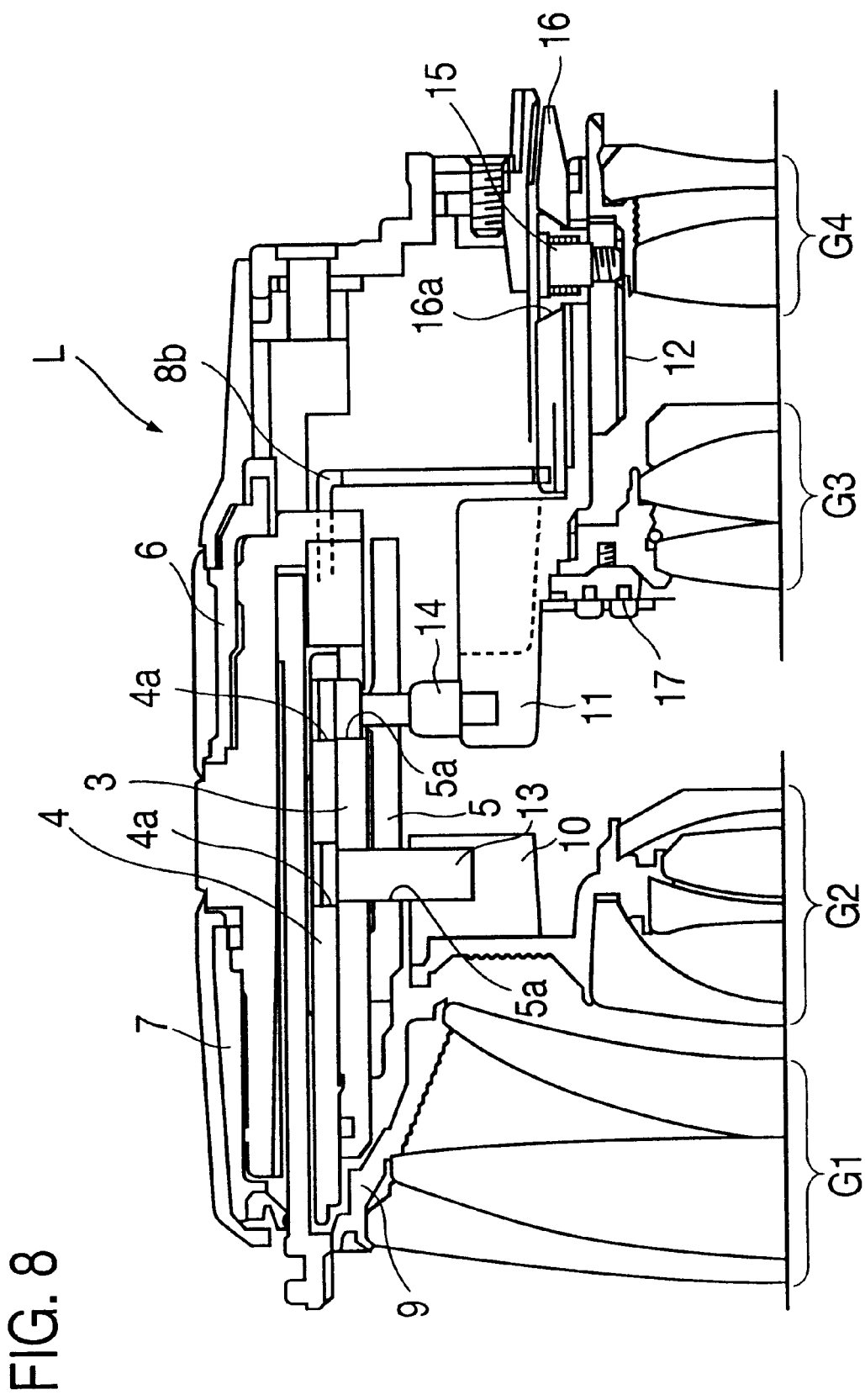
FIG. 8 is a cross-sectional view showing the upper half of the lens barrel in the wide angle condition.
Figure 9:
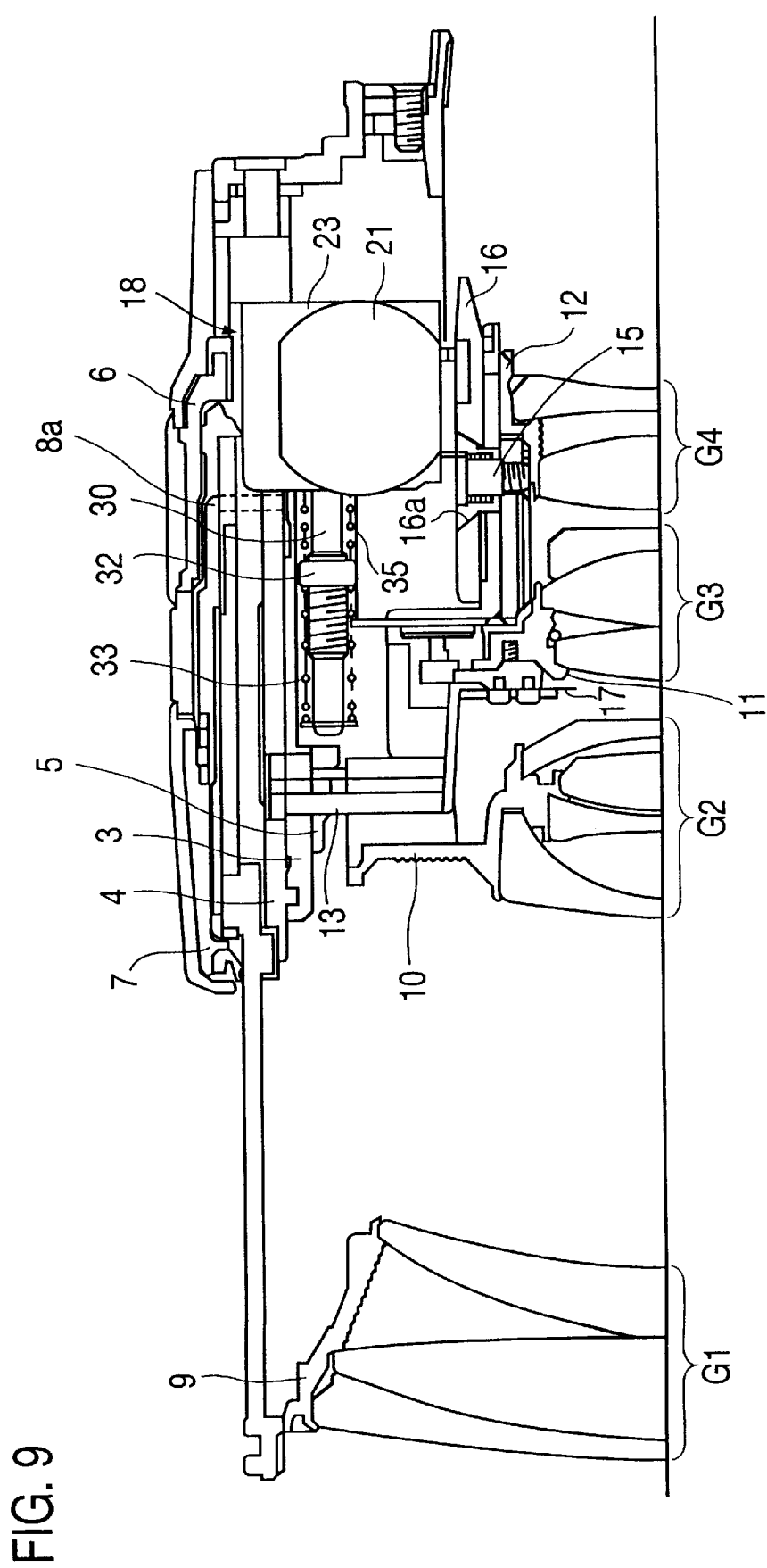
FIG. 9 is a cross-sectional view showing the upper half of the lens barrel in the telephoto condition.
Figure 10A:
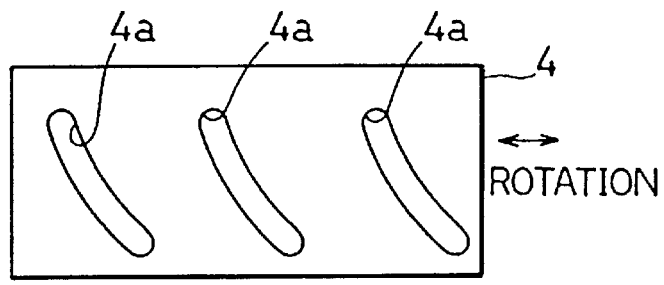
FIGS. 10A, 10B and 10C are schematic developments of a zoom cam ring, a stationary barrel and a focus cam ring, respectively.
Figure 10B:
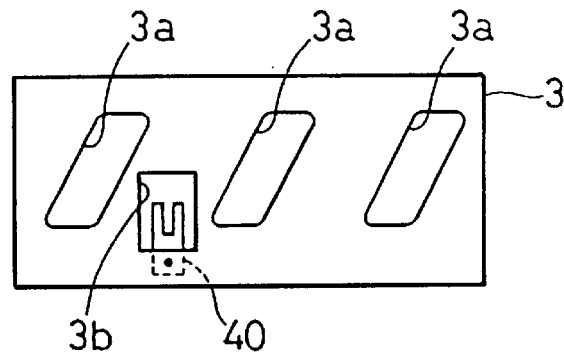

FIGS. 8 and 9 are cross-sectional views of a lens barrel L. FIG. 8 shows a wide angle limit condition (shortest focal length condition). FIG. 9 shows a telephoto limit condition (longest focal length condition). The lens barrel L according to this embodiment shown in these figures has a varifocal mechanical correcting mechanism for mechanically driving the lens both during zooming and during focusing. Numeral 3 represents a stationary barrel having, as shown in the development of FIG. 10B, clearance holes 3a for allowing second and third lens unit guiding rollers 13 and 14 to move and a brush window 3b facing a subsequently-described brush 40 of a limit sensing switch 39.

On the outer dimension of the stationary barrel 3, a zoom cam ring 4 is fitted so as to be only rotatable with its movement along the optical axis prevented by the stationary barrel 3. The zoom cam ring 4 has, as shown in FIG. 10A, zoom cam grooves 4a with which the second and third lens unit guiding rollers 13 and 14 engage.

Figure 10C:
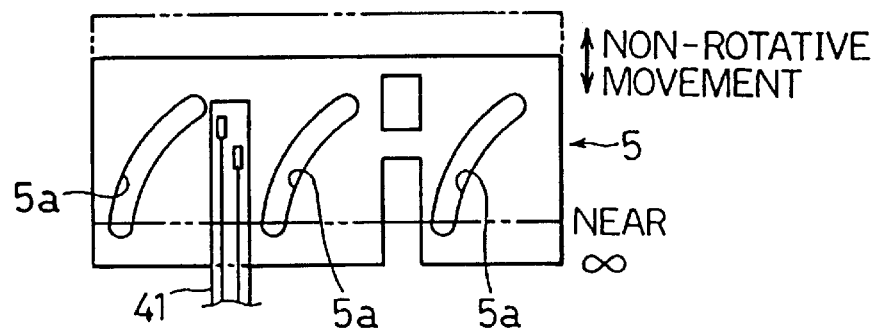

On the inner dimension of the stationary barrel 3, a focus cam ring 5 is fitted so as to be only movable along the optical axis with its rotation prevented. The focus cam ring 5 has, as shown in FIG. 10C, focus cam grooves 5a with which the second and third lens unit guiding rollers 13 and 14 engage. To the focus cam ring 5, a subsequently-described flexible substrate 41 of the limit sensing switch 39 is attached. In the figure, the imaginary line shows a condition where the focus cam ring 5 is at the near limit and the solid line shows a condition where the focus cam ring 5 is at the infinity limit. The focus cam ring 5 is non-rotatively moved along the optical axis within a predetermined range.

Numeral 6 represents a focusing ring rotated for manual focusing. The focusing ring 6 is provided on the outermost periphery on the rear side of the lens barrel. Although not shown, the focusing ring 6 has a pulse signal generating means for driving a subsequently-described focus driving motor 21. Numeral 7 represents a zooming ring rotated for zooming. The zooming ring 7 is provided on the outermost periphery on the front side of the lens barrel. The zooming ring 7 interlockingly rotates the zoom cam ring 4 through a first zoom interlock lever 8a and interlockingly rotates a subsequently-described fourth lens unit cam ring 16 through a second interlock lever 8b.

Numerals 9 to 12 represent first to fourth lens unit moving frames for holding corresponding lens units G1 to G4. The second lens unit moving frame 10 has the second lens unit guiding roller 13. The third lens unit moving frame 11 has the third lens unit guiding roller 14 on its outer dimension. The second lens unit guiding roller 13 and the third lens unit guiding roller 14 are both engaged with corresponding zoom and focus cam grooves 4a and 5a. The fourth lens unit moving frame 12 has a fourth lens unit guiding roller 15 on its outer dimension. The fourth lens unit guiding roller 15 engages with a cam groove 16a formed in a fourth lens unit cam ring 16. The third lens unit moving frame 11 has an aperture stop mechanism 17.

Figure 11:
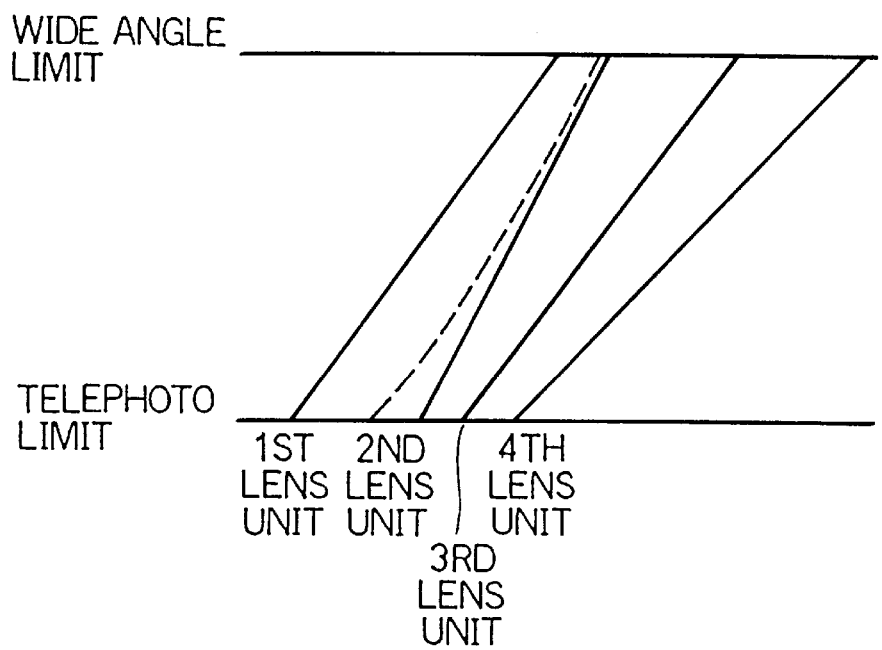
FIG. 11 shows loci of movements of lens units during zooming and focusing.
Figure 12:
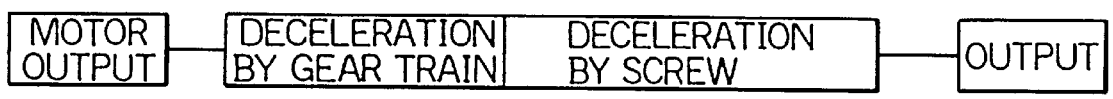
FIG. 12 shows the proportion of the deceleration by the gear to the deceleration by the screw in the embodiment.

The loci of movements of the first to fourth lens units G1 to G4 during zooming at the infinity limit are shown by the solid lines of FIG. 11. The locus of movement of the second lens G2 at the near limit is shown by the dotted line of FIG. 11. As shown in the figure, the second lens G2 is mainly used for focusing.

In order to drive the above-described optical system with a motor having a limited output, deceleration of a predetermined amount or more is necessary between the output shaft of the motor and the input end of the optical system. The deceleration mechanism is typically comprised of a combination of a gear train connected to the output shaft and a screw connected to the input end of the optical system. By reducing the proportion of the deceleration by the gear train to increase the proportion of the deceleration by the screw, the number of gears is reduced. In addition, the deceleration by the screw is easily realized by reducing the screw pitch and does not require a large space, so that the space is effectively used. As a result, the lens barrel L is made compact.

Figure 13:
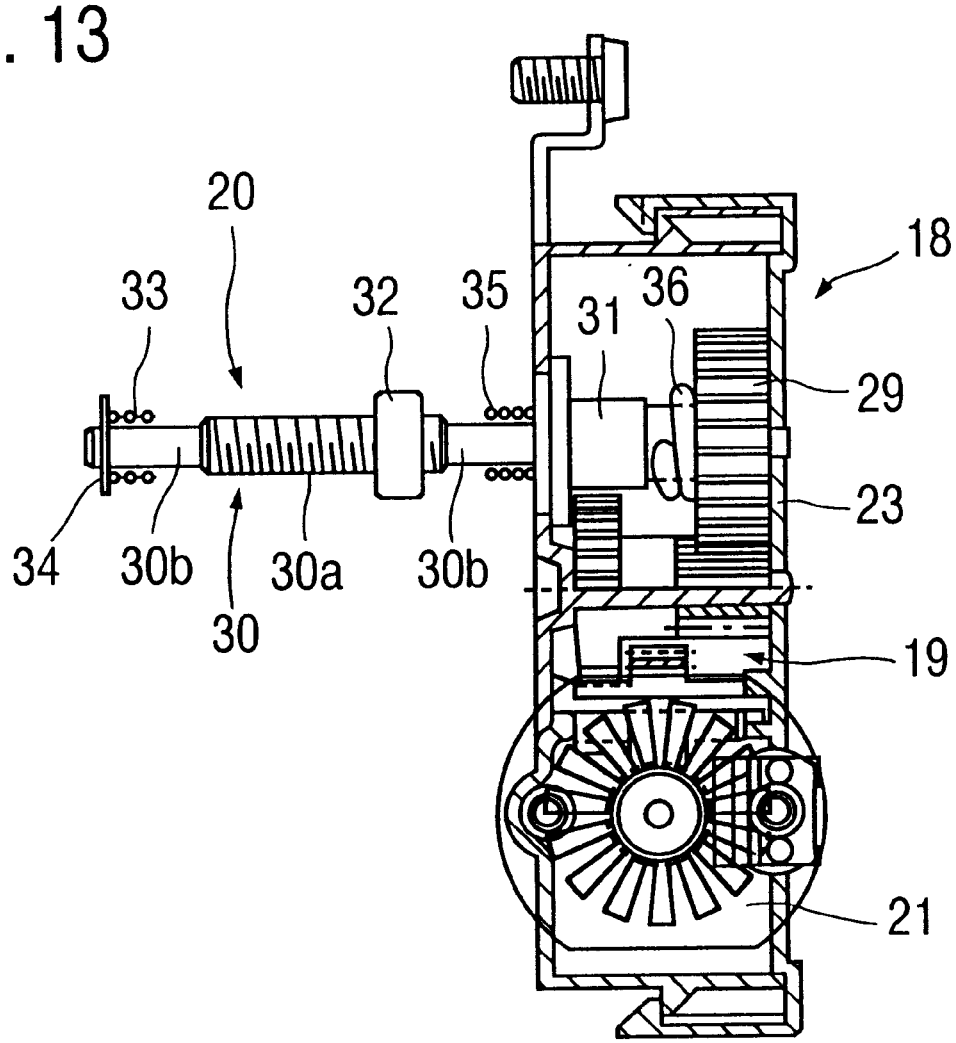
FIG. 13 is a side view of a focus driving mechanism.
Figure 14:
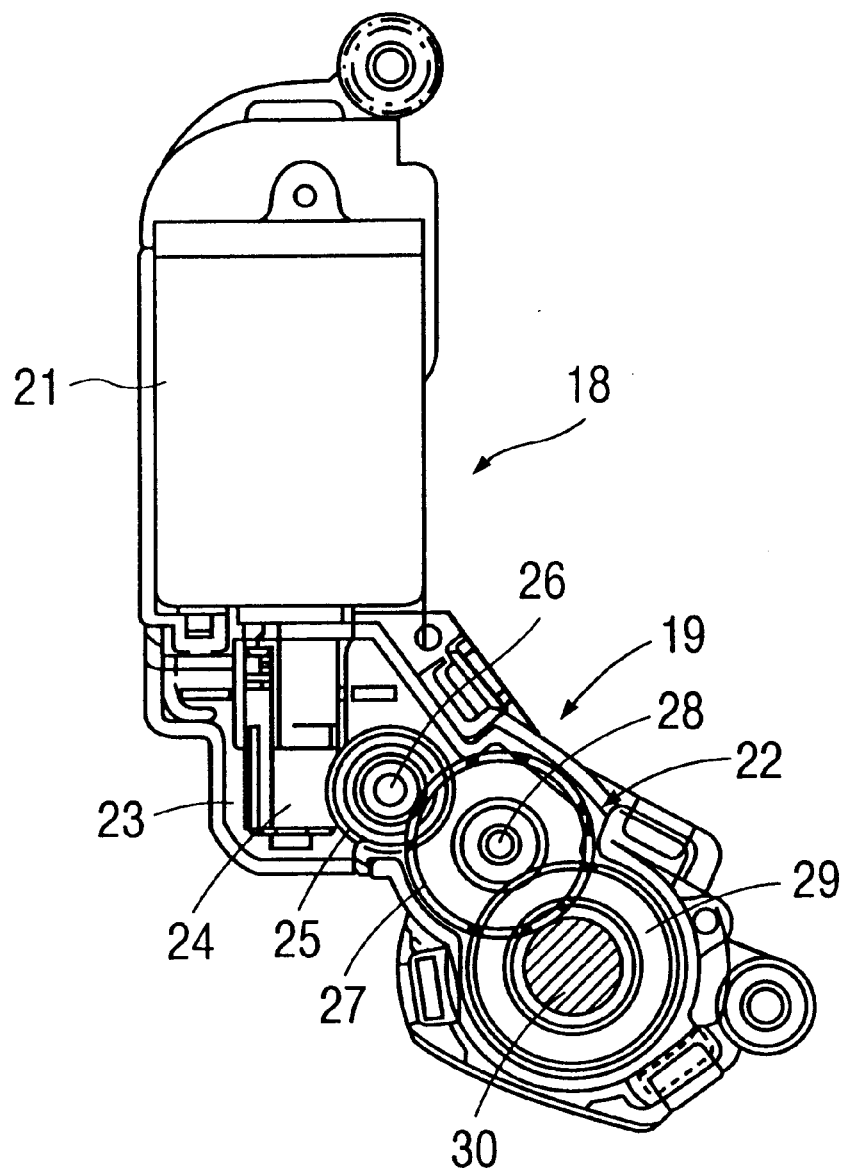
FIG. 14 is a front view of the focus driving mechanism.
Figure 15:
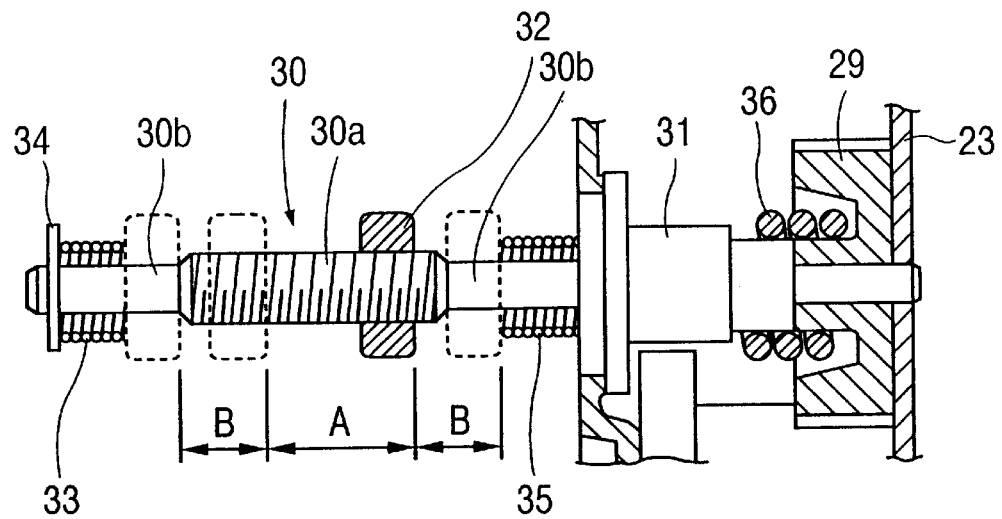
FIG. 15 is an enlarged side view of a screw driver.
Figure 16A:
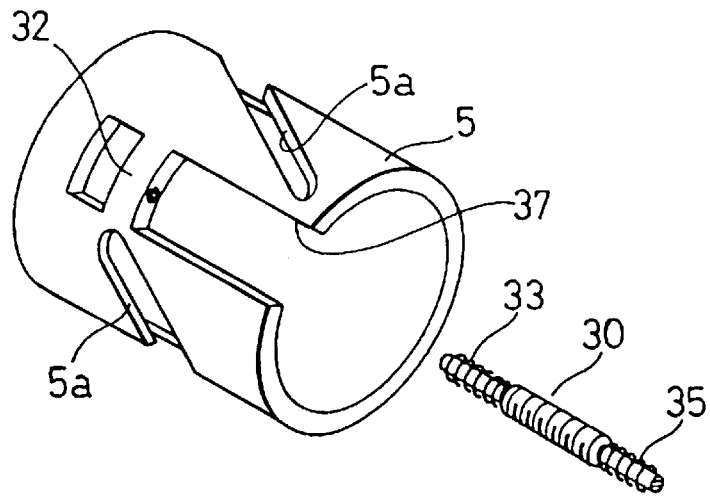
FIG. 16A shows an example of connection between the focus driving mechanism and the focus cam ring.
Figure 16B:
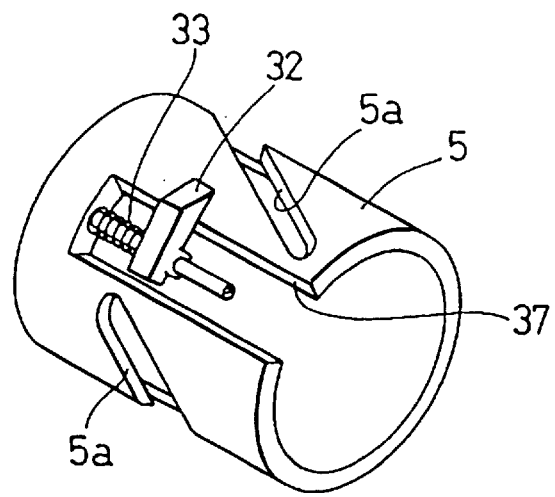
FIG. 16B shows another example of connection between the focus driving mechanism and the focus cam ring.
Figure 16C:
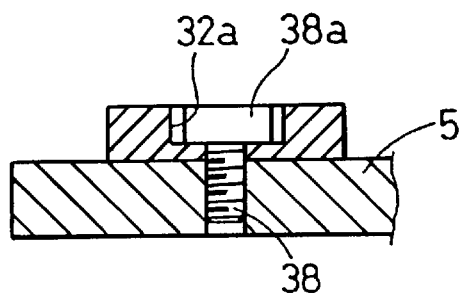
FIG. 16C shows yet another example of connection between the focus driving mechanism and the focus cam ring.
Figure 16D:
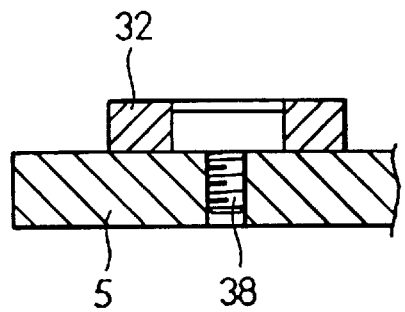
FIG. 16D shows still another example of connection between the focus driving mechanism and the focus cam ring.
Figure 17:
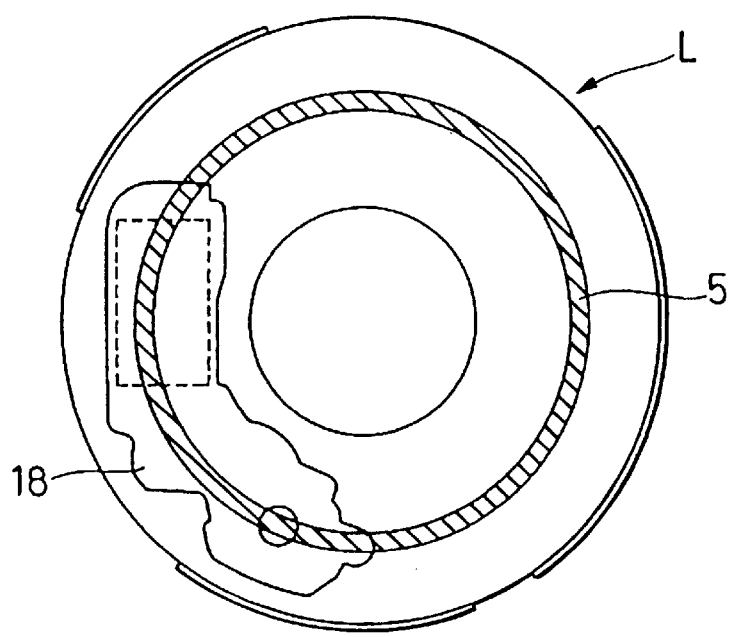
FIG. 17 is a schematic cross-sectional view showing a position of the focus driving mechanism in the lens barrel.

FIGS. 13 to 17 show a focus driving mechanism 18 of the optical system. FIG. 13 is a side view of the mechanism 18. FIG. 14 is a front view thereof. FIG. 15 shows details of a screw driver 20. FIGS. 16A to 16D show a connection to the focus cam ring 5. FIG. 17 shows the position in the lens barrel 5. As shown in FIGS. 13 and 14, the focus driving mechanism 18 comprises a gear driver 19 and the screw driver 20.

The gear driver 19 comprises a housing 23 incorporating a focus driving motor 21 serving as the driving source and a deceleration gear train 22 interposed between the output shaft of the motor 21 and the screw driver 20. The deceleration gear train 22 has a four-stage deceleration structure including a worm 24 provided on the output shaft of the motor 21, a worm gear 25 engaging with the worm 24, a first intermediate gear 26 being of a small diameter and coaxial with the worm gear 25, a second intermediate gear 27 being of a large diameter and engaging with the first intermediate gear 26, a third intermediate gear 28 being of a small diameter and coaxial with the second intermediate gear 27, and a fourth intermediate gear 29 being of a large diameter and engaging with the third intermediate gear 28. A feed screw 30 of the screw driver 20 which is a cam ring constituting member is provided coaxially with the fourth intermediate gear 28 on the last stage.

As shown in FIG. 15, a boss 31 of the feed screw 30 is rotatably held by the housing 23. The feed screw 30 includes a threaded portion 30a formed in a central portion to have a length covering a normal drive range A, and a shank portion 30b which is a non-threaded portion formed on either side of the threaded portion 30a. The feed screw 30 has a nut-like feed screw follower 32 engaging with the threaded portion 30a.

At the tip of the feed screw 30, a first spring 33 is provided to abut on an end surface of the feed screw follower 32. Numeral 34 represents a spring bearing for the first spring 33. The bearing 34 is attached to the tip of the feed screw 30. At the base side end of the feed screw 30, a second spring 35 is provided to be born by an end surface of the boss 31 and to abut on the other end surface of the feed screw follower 32. By the first and second springs 33 and 35, the feed screw follower 32 is pushed on the shank portion 30b in a direction to engage with the threaded portion 30a.

Between the boss 31 and the fourth intermediate gear 29 is interposed a shock absorbing spring 36 which absorbs shocks received by the feed screw 30 to prevent failure and breakage.

The feed spring follower 32 is connected to the focus cam ring 5 to be integral therewith. FIG. 16A shows an example of the connection where a recess 37 is formed in the peripheral wall of the focus cam ring 5 and at a predetermined position in the recess 37, the feed screw follower 32 is integrally formed to span the recess 37 along its width by use of the thickness of the cam ring 5. By providing such a recess 37 and providing the screw driver 20, space is effectively saved.

FIG. 16B shows another example in which a cantilever feed screw follower 32 is integrally formed to face the recess 37 of the focus cam ring 5. Alternatively, as shown in FIG. 16C, a feed screw follower 32 having the same configuration as that of FIG. 16B is separately formed and secured by a screw 38 to the recess 37 of the focus cam ring 5 to cantilever. In this case, a hole 32a of the feed screw follower 32 in which a screw head 38a is inserted may be formed to be oblong so that the position of the screw 38 is fixed along the optical axis but adjustable in a direction perpendicular to the optical axis in order that positional errors of the parts are absorbed by the oblong hole 32a. Alternatively, as shown in FIG. 16D, the head of the screw 38 and the screw follower 32 may be engaged with each other so that, although there is no clearance along the optical axis, the errors of the parts along the diameter are absorbed.

The focus driving mechanism 18 thus structured is mounted in the lens barrel L as shown in FIG. 17 and operates to non-rotatively move the focus cam ring 5 along the optical axis within the normal drive range. In this embodiment, a detector comprising an electric switch is provided for detecting the normal drive range of the focus cam ring 5.

Figure 18:
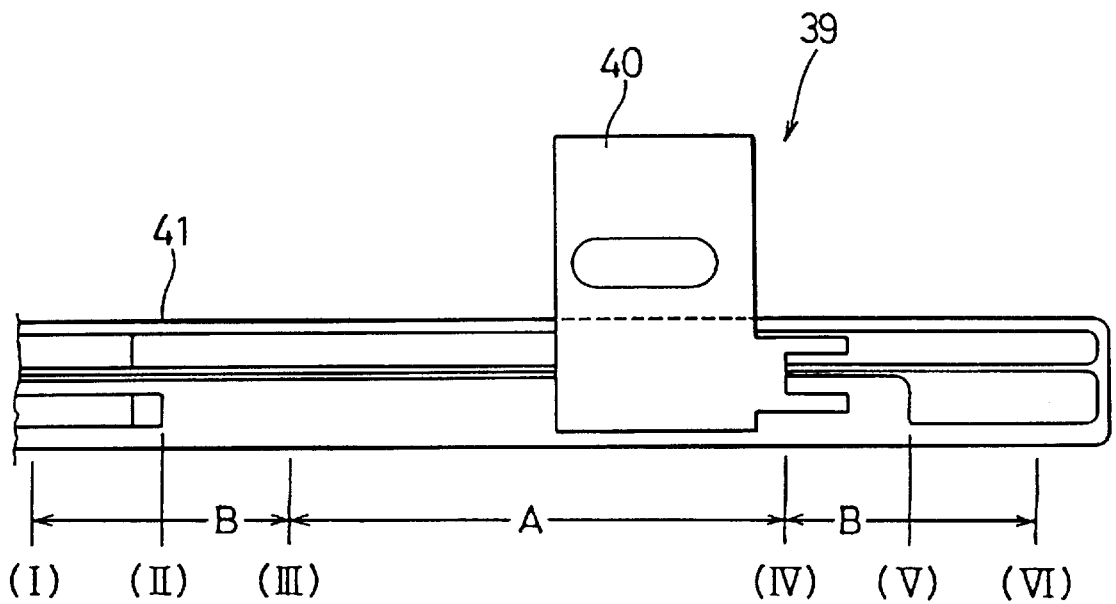
FIG. 18 schematically shows a structure of a limit sensing switch.

FIG. 18 shows a limit sensing switch 39 serving as the detector. The limit sensing switch 39 comprises as mentioned above the brush 40 attached to face the brush window 3c of the stationary barrel 3 and the flexible substrate 41 attached to the periphery of the limit sensing switch 39 along the optical axis. The limit sensing switch 39 detects the infinity limit and the near limit of the feed screw follower 32 of the focus driving mechanism 18.

In FIG. 18, (I) is a mechanical disengagement position on the near side, (II) is a switch ON position on the near side, and (III) is a nearest position. (IV) is an optical infinity position, (V) is a switch ON position on the optical infinity side, and (VI) is a mechanical disengagement position on the optical infinity side. The distance between the nearest position (III) and the optical infinity position (IV) corresponds to the normal drive range A on the threaded portion 30a shown in FIG. 15. The distance between the near side mechanical disengagement position (I) and the nearest position (III) and the distance between the optical infinity position (IV) and the optical infinity side mechanical disengagement position (VI) correspond to an overshoot range B on the threaded portion 30a. The switch ON positions (II) and (V) are set in the middle of the overshoot range B.

Figure 19:
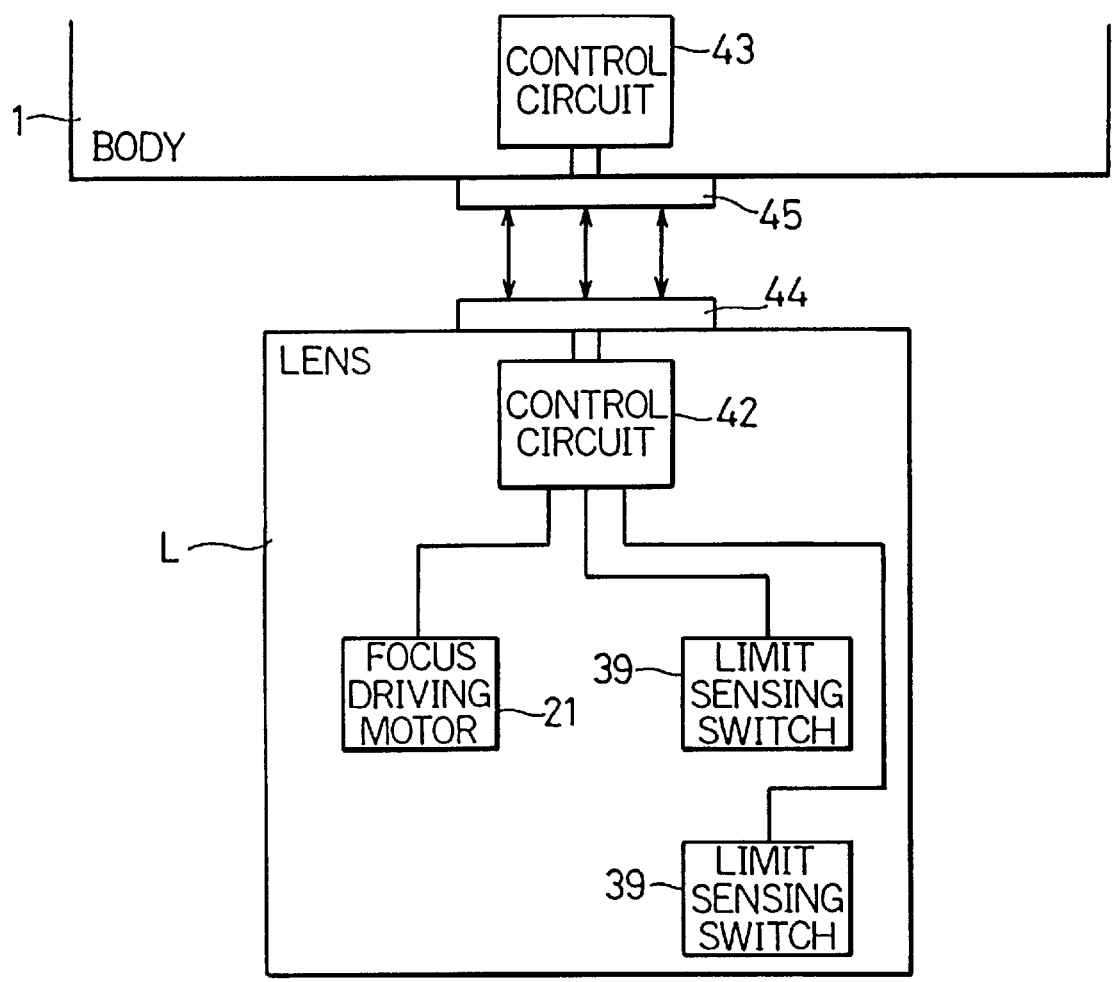
FIG. 19 diagrammatically shows electrical connection between the lens barrel and the camera body.

FIG. 19 shows an electrical connection between the lens barrel L and the body 1 associated with focusing. Numeral 42 represents a control circuit provided in the lens barrel L. Numeral 43 represents a control circuit provided in the body 1. Numerals 44 and 45 each represent an input/output (I/O).

Subsequently, an operation of the above-described arrangement will be described. Prior to the description of the specific operation, the varifocal mechanical correction will be described. The optical system of the zoom lens barrel according to this embodiment employing the internal focusing method (second lens unit focusing method) as described above is a varifocal optical system which is structured as a normal zoom lens system by a mechanical correction with a well-devised cam configuration.

The specific operation of this embodiment will be described. For zooming, the zooming ring 7 is manually rotated. The rotation is transmitted to the zoom cam ring 4 through the first zoom interlock lever 8a. When the zoom cam ring 4 rotates, the first lens unit moving frame 9, the second lens unit moving frame 10 and the third lens unit moving frame 11 are driven through the second lens unit guiding roller 13 and the third lens unit guiding roller 14. The rotation of the zooming ring 7 is also transmitted to the fourth lens unit cam ring 16 through the second zoom interlock lever 8b. When the fourth lens unit cam ring 16 rotates similarly to the zoom cam ring 4, the fourth lens unit moving frame 12 is driven through the fourth lens unit guiding roller 15.

Subsequently, an operation for focusing will be described. For automatic focusing, the body side control circuit 43 shown in FIG. 18 outputs a control signal, and the lens barrel side control circuit 42 receives the control signal through the I/O 44 and the I/O 45 to drive the focus driving motor 21. The power to drive the motor 21 is supplied from the body 1 when the lens barrel L is mounted on the body 1.

The rotation of the motor 21 is decelerated by the deceleration gear train 22 and transmitted to the feed screw 30. Then, by the rotation of the feed screw 30, the feed screw follower 32 is non-rotatively moved by the pitch of the feed screw 30, so that the focus cam ring 5 is non-rotatively moved along the optical axis integrally with the feed screw follower 32. The movement of the focus cam ring 5 is transmitted to the second lens unit moving frame 10 through the second lens unit guiding roller 13, so that automatic focusing is performed mainly by the movement of the second lens unit moving frame 10.

For focusing performed by rotating the focusing ring 6, when the focusing ring 6 is rotated, a drive control pulse signal is generated from the above-mentioned non-illustrated pulse signal generating means and supplied to the control circuit 43 of the body 1.

Then, the control circuit 43 drives the focus driving motor 21 based on the drive control pulse signal. Then, similarly to the case of the automatic focusing, the feed screw 30 is rotated through the deceleration gear train 22, the feed screw follower 32 is driven by the pitch of the feed screw 30 to drive the focus cam ring 5 integrally connected with the feed screw follower 32, and the movement of the focus cam ring 5 is transmitted to the second lens unit moving frame 10 through the second lens unit guiding roller 13 to perform focusing.

The operation and control manner of the focus driving mechanism 18 will be described in more detail. The limit position of the feed screw follower 32 of the feed screw 30 is detected based on the detection by the limit sensing switch 39 shown in FIG. 18. The limit sensing switch 39 sends a limit sensing signal to the body side control circuit 43 when detecting a predetermined number of pulses by a movement of the brush 40 and the flexible board 41 relative to each other, thereby switching the rotation direction of the motor 21. The signal generated by the limit sensing switch 39 is a 2-bit signal by which both the near side and the optical infinity side are determined.

When the feed screw follower 32 reaches the overshoot range B while being moved from the near side toward the optical infinity side, the optical infinity side switch ON position (V) is detected based on the set pulse number and the switch is turned on at that position, thereby detecting disengagement of the feed screw follower 32 from the feed screw 30. Likewise, when the feed screw follower 32 reaches the overshoot range B while being moved from the optical infinity side toward the near side, the near side switch ON position (II) is detected based on the set pulse number and the switch is turned on at that position, thereby detecting disengagement of the feed screw follower 32 from the feed screw 30. The order of this processing cannot be changed.

Since the motor 21 is stopped by the detection by the limit sensing switch 39 as described above, the feed screw follower 32 and the focus cam ring 5 are prevented from being driven to the overshoot range. However, the detection may become impossible, for example, when a mechanically operating portion of the limit sensing switch 39 becomes dusty. In such a case, the feed screw follower 32 may be moved into the overshoot range B to reach the near side mechanical disengagement position (I) or the optical infinity side mechanical disengagement position (VI). To prevent this, in this embodiment, the feed screw follower 32 is returned into the normal drive range A.

Specifically, reverting to FIG. 15, the feed screw follower 32 is located at the optical infinity position (IV) when it is moved to an end position a of the threaded portion 30a on the base side of the feed screw 30 and it is located at the nearest position (III) when it is moved to an end position b of the threaded portion 30a on the tip side of the feed screw 30. In a range of the normal drive range A between the nearest position (III) and the optical infinity position (IV) in which range focusing is performed, the feed screw follower 32 operates on the threaded portion 30a of the feed screw 30.

Both during automatic focusing and during manual focusing, when the feed screw follower 32 is moved past the normal drive range A, the feed screw follower 32 reaches the overshoot range B. In this case, the feed screw follower 32 is located on the shank portion 30b formed on either side of the threaded portion 30a of the feed screw 30. However, since there is no thread on the shank portion 30b, the feed screw 30 and the feed screw follower 32 do not engage with each other, so that only the feed screw 30 continues to rotate idly.

After a predetermined period of time, the idle rotation of the feed screw 30 is stopped by the focus driving motor 21 being stopped by a timer (not shown) provided in the body 1. Then, the motor 21 is driven in a reverse direction by the control circuit 43 to rotate the feed screw 30 in a reverse direction. Since the feed screw follower 32 is pushed by the first spring 33 or the second spring 35 at all times in a direction to engage with the threaded portion 30a of the feed screw 30, the feed screw 30 and the feed screw follower 32 engage with each other again so that the feed screw follower 32 normally operates in the normal drive range A.

In this embodiment, the normal drive range A is 4.2 mm and the overshoot ranges B are 2.3 mm. While these ranges are applied for the focus cam ring 5 as a non-rotatively movable cam ring in this embodiment, the present invention is not limited thereto.

As described above, according to the present invention, the non-rotatively movable cam ring is moved by the feed screw rotated by the driving source. As a result, space is saved and the number of parts is reduced to reduce the cost.

What is claimed is:

1. A lens barrel for a camera, having a varifocal mechanical correction mechanism that mechanically drives a lens comprising:
   a first cam ring for zooming, and
   a second cam ring for focusing,
   wherein one of the first cam ring and the second cam ring linearly moves in and out along an optical axis by a feed screw that is driven to rotate by a driving power source, and wherein said feed screw has a shank portion outside a normal feed range, and shank portion is provided on a portion of said feed screw where no threads are formed.

2. A lens barrel for a camera as claimed in claim 1, wherein said second cam ring is moved in and out along the optical axis by said feed screw.

3. A lens barrel for a camera as claimed in claim 1, wherein, when one of the first cam ring and the second cam ring is driven by said feed screw on said shank portion, the same one of the first cam ring and the second cam ring is pressed in a direction that enables screw engagement.

4. A lens barrel for a camera as claimed in claim 1, wherein said lens barrel is provided with a detector for detecting a normal feed range of the one of the first cam ring and the second cam ring that is moved in and out by said feed screw.

5. A lens barrel comprising:
   a lens holder that holds a lens and that is movable in an optical axis direction;
   an engagement portion that is engaged with said lens holder and that has a screw engagement portion on which screw threads or screw grooves are formed;
   a feed screw mechanism that comprises a screw portion on which screw threads or screw grooves are formed and a shank portion formed adjacent to the screw portion and that is rotatable in forward and reverse directions, said feed screw mechanism moving said lens holder when said screw portion is engaged with said screw engagement portion and is rotated together, said feed screw mechanism running idle even if rotated when said screw engagement portion is disengaged from said screw portion and is located on said shank portion; and
   a pressing mechanism for pressing said engagement portion toward said screw portion when the engagement portion is located on said shank portion.

6. A lens barrel as claimed in claim 5,
   wherein said shank portion is formed on both sides of said screw portion, and said pressing mechanism is provided for each shank portion.

7. A lens barrel as claimed in claim 6,
   wherein said lens holder is a focus cam ring for performing focusing, wherein said screw feed mechanism comprises a screw portion formed by forming screw threads on a cylindrical shaft and a shank portion formed by forming a portion adjacent to the screw portion of the cylindrical shaft into a shaft having a diameter smaller than that of the screw threads, and wherein said engagement portion has in said focus cam ring a bore formed parallel to the optical axis so that the bore is engaged with said screw feed mechanism to allow the screw feed mechanism to directly move the focus cam ring.

8. A lens barrel as claimed in claim 5,
   wherein said screw feed mechanism comprises a screw portion formed by forming screw threads on a cylindrical shaft and a shank portion formed by forming a portion adjacent to the screw portion of the cylindrical shaft into a shaft having a diameter smaller than that of the screw threads.

9. A lens barrel as claimed in claim 8,
   wherein said engagement portion has in said lens holder a bore formed parallel to the optical axis so that the bore is engaged with said screw feed mechanism to allow the screw feed mechanism to directly move the lens holder.

10. A lens barrel as claimed in claim 8,
    wherein said engagement portion has a bore formed parallel to the optical axis so that the bore is engaged with said screw feed mechanism, and said engagement portion is formed as a member separate from said lens holder so that it is engaged with a notch formed in the lens holder.

11. A lens barrel as claimed in claim 5,
    wherein said lens barrel is further provided with a detection mechanism for detecting an overrun of said engagement portion out of a feed range of said screw feed mechanism.

12. A moving mechanism as claimed in claim 5,
    wherein said screw portion, said shank portion, and said engagement portion have lengths, along said feed screw mechanism, satisfying the following condition:
    (Length of Screw Portion)>(Length of Shank Portion)>(Length of Engagement portion).

13. A method of moving a lens in a camera, comprising the steps of:
    providing a lens holder that holds a lens and that is movable in an optical axis direction;
    providing an engagement portion that is engaged with said lens holder and that has a screw engagement portion on which screw threads or screw grooves are formed;

providing a feed screw mechanism that comprises a screw portion on which screw threads or screw grooves are formed and a shank portion formed adjacent to the screw portion and that is rotatable in forward and reverse directions, said feed screw mechanism moving said lens holder when said screw portion is engaged with said screw engagement portion and is rotated together, said feed screw mechanism running idle even if rotated when said screw engagement portion is disengaged from said screw portion and is located on said shank portion; and providing a pressing mechanism for pressing said engagement portion toward said screw portion when the engagement portion is located on said shank portion.

14. A method of moving a lens in a lens barrel having a varifocal mechanical correction mechanism that mechanically drives a lens by use of a first cam ring and a second cam ring during both zooming and focusing, comprising the step of:

linearly moving one of the first cam ring and the second cam ring in and out along an optical axis of said lens by a feed screw that is driven to rotate by a driving power source; and disengaging said one the first cam ring and the second cam ring from said feed screw when said one the first cam ring and the second cam ring is moved on to a shank portion of said feed screw, said shank portion being outside a normal feed range where no threads are formed on said feed screw.

15. A method of driving a varifocal lens, comprising the steps of:

driving a feed screw by a driving force transmitted from a predetermined driving force source; and moving-out a cam ring straight along an optical axis by driving said feed screw, said feed screw being engaged with said cam ring; and disengaging said cam ring from said feed screw when said cam ring is moved on to a shank portion of said feed screw, said shank portion being outside a normal feed range where no threads are formed on said feed screw.

16. A lens barrel for a camera, having a varifocal mechanical correction mechanism that mechanically drives a lens comprising:

a zoom ring for zooming, and a focus cam ring for focusing, wherein the focus cam ring linearly moves in and out along an optical axis by a feed screw that is driven to rotate by a driving power source, and wherein said feed screw has a shank portion outside a normal feed range, and the shank portion is provided on a portion of said feed screw where no threads are formed.

17. A lens barrel for a camera as claimed in claim 16, wherein, when the focus cam ring is driven by said feed screw on said shank portion, the focus cam ring is pressed in a direction that enables screw engagement.

18. A lens barrel for a camera as claimed in claim 16, wherein said lens barrel is provided with a detector for detecting a normal feed range of the focus cam ring.

19. A method of moving a lens in a lens barrel having a varifocal mechanical correction mechanism that mechanically drives a lens by use of a zoom cam ring and a focus cam ring during both zooming and focusing, comprising the step of:

linearly moving the focus cam ring in and out along an optical axis of said lens by a feed screw that is driven to rotate by a driving power source; and disengaging the focus cam ring from said feed screw when the focus cam ring is moved on to a shank portion of said feed screw, said shank portion being outside a normal feed range where no threads are formed on said feed screw.

20. The method according to claim 19, further comprising the step of: when the focus cam ring is driven by said feed screw on said shank portion, pressing the focus cam ring in a direction that enables screw engagement.

21. The method according to claim 20, further comprising the steps of:

stopping the rotation of said feed screw after a predetermined time; and rotating said feed screw in the opposite direction thereby causing engagement of said feed screw with the focus cam ring.

* * * * *